United States Patent
Powell

(10) Patent No.: US 7,434,347 B1
(45) Date of Patent: Oct. 14, 2008

(54) WATERFOWL LURING SYSTEM

(76) Inventor: Charles D. Powell, 205 Big Valley Rd., Andersonville, TN (US) 37705

( * ) Notice: Subject to any disclaimer, the term of this patent is extended or adjusted under 35 U.S.C. 154(b) by 1048 days.

(21) Appl. No.: 10/696,906

(22) Filed: Oct. 30, 2003

Related U.S. Application Data

(63) Continuation-in-part of application No. 10/126,993, filed on Apr. 22, 2002, now abandoned.

(51) Int. Cl.
*A01M 31/06* (2006.01)

(52) U.S. Cl. .......... 43/3

(58) Field of Classification Search .......... 43/2, 43/3
See application file for complete search history.

(56) References Cited

U.S. PATENT DOCUMENTS

| | | | |
|---|---|---|---|
| 278,461 A | 5/1883 | Screven | |
| 2,547,286 A * | 4/1951 | Sabin | 43/3 |
| 2,575,252 A | 11/1951 | Berger | |
| 2,849,823 A | 9/1958 | Miller | |
| 3,665,892 A | 5/1972 | Kusisto | |
| 3,768,192 A * | 10/1973 | Caccamo | 43/3 |
| 4,128,958 A | 12/1978 | Snow | |
| 4,141,167 A | 2/1979 | Muehl | |
| 5,713,306 A | 2/1998 | Johnson | |
| 5,862,619 A | 1/1999 | Stancel | |
| 5,875,737 A | 3/1999 | Boshears | |
| 5,941,196 A | 8/1999 | Domanski | |
| 5,956,880 A * | 9/1999 | Sugimoto | 43/2 |
| 6,016,771 A | 1/2000 | Baiera et al. | |
| 6,058,887 A | 5/2000 | Silverman | |
| 6,408,559 B2 | 6/2002 | Mathews | |
| 6,484,431 B2 | 11/2002 | Price | |
| 6,493,980 B1 | 12/2002 | Richardson | |
| 6,508,028 B1 | 1/2003 | Crowe | |
| 6,634,133 B1 * | 10/2003 | Levandowski | 43/3 |
| 2002/0100206 A1 | 8/2002 | Brint | |
| 2003/0196367 A1 * | 10/2003 | Powell | 43/3 |
| 2003/0204983 A1 * | 11/2003 | Porter | 43/3 |

* cited by examiner

*Primary Examiner*—Kurt Rowan
(74) *Attorney, Agent, or Firm*—Gable Gotwals

(57) ABSTRACT

A waterfowl luring system provides directional motion to one or more waterfowl decoys. The system employs a motor or other force-generating device to rotate a platform to which one or more decoys are attached so that the decoys are moved in relation to rotation of the platform. In operation, the decoys are moved along a substantially circular flight path. The system is highly versatile and may be employed on dry land or in shallow as well as deep water environments.

20 Claims, 7 Drawing Sheets

US 7,434,347 B1

WATERFOWL LURING SYSTEM

PRIORITY CLAIM

This application is a continuation-in-part (CIP) of U.S. patent application Ser. No. 10/126,993 filed 22 Apr. 2002 now abandoned and entitled DUCK IN A BUCKET.

FIELD OF THE INVENTION

The present invention relates generally to waterfowl decoys. More particularly, the present invention relates to a waterfowl decoy system which simulates natural directional movement of waterfowl.

BACKGROUND OF THE INVENTION

Static decoys have been used for many years to attract wild game such as ducks and geese. Hunters have learned, however, that adding movement to a decoy enhances the decoy's ability to attract game. Consequently, there are a variety of motion-creating decoys now in use. For example, some animated decoys are designed to shake or vibrate on the surface of the water to simulate swimming or feeding activity. Other animated decoys are designed to simulate a waterfowl shaking off water or flapping its wings while sitting on the water, both of which are natural activities that can be observed in most types of waterfowl.

A particularly popular type of motion-creating decoy incorporates an electric motor to spin the wings of the decoy. In use, the decoy is mounted atop a post that protrudes from the ground and the wings of the decoy are spun by the motor to simulate a settling bird. Unfortunately, such decoys are incapable of adequately simulating the natural directional movements of real waterfowl. Additionally, use of such decoys is generally restricted to dry land or shallow water environments since the post must be inserted into the ground or otherwise anchored in place to provide a sturdy, stable platform for positioning and supporting the decoy.

What is needed, therefore, is a waterfowl decoy system that eliminates one or more disadvantages of prior art decoys.

BRIEF SUMMARY OF THE INVENTION

The present invention achieves its objections by providing an apparatus for luring waterfowl. The apparatus includes a rotatable platform and a force-generating unit, such an electric motor or jet propulsion device, for rotating the rotatable platform. A power source provides power to the force-generating unit to rotate the rotatable platform. One or more support arms are attached to the rotatable platform with each support arm including a lower end attached to the rotatable platform and an upper end positioned above the rotatable platform. A waterfowl decoy is attached to the upper end of each support arm with the decoy being positioned above the rotatable platform. The support arms are preferably flexible and bend when loaded by an attached decoy and/or by forces generated during operation of the apparatus. In operation, each decoy is moved along a substantially circular path above the rotatable platform as the rotatable platform is rotated by the force-generating unit, thereby providing a lure for waterfowl.

In one embodiment, the rotatable platform is secured to the output shaft of an electric motor and rotated by the motor. In another embodiment, the rotatable platform is rigidly attached to a buoyant housing and the housing is rotated. The system is versatile and can be deployed in deep water, shallow water, or dry land environments.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
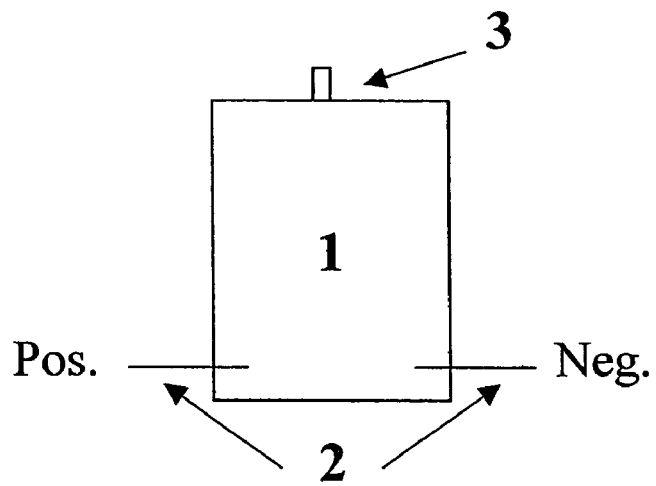
FIG. 1 is a side view of an electric motor for use in a waterfowl decoy system according to the invention.

Turning now to the drawings wherein like reference characters indicate like or similar parts throughout, FIG. 1 illustrates an electric motor 1 having a rotatable shaft 3 extending vertically out of the top. The motor 1 has electrical connections 2 for a power source. The motor 1 functions as a force-generating unit which rotates a rotatable platform 12 as shown in FIG. 5.

Figure 2:
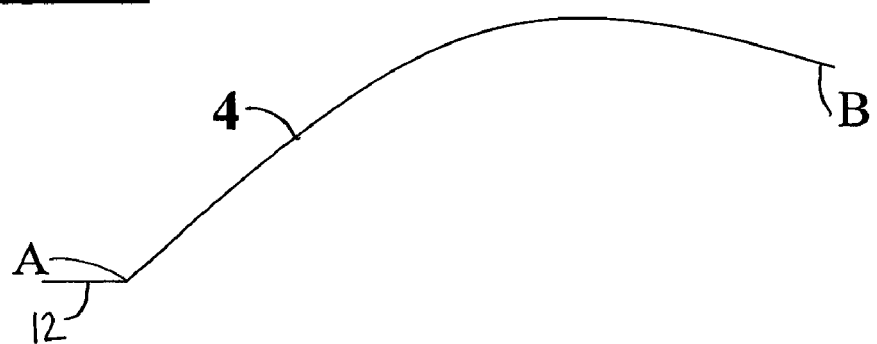
FIG. 2 is a side view of a decoy support arm for use in a waterfowl decoy system according to the invention.

A support arm 4 is shown in FIG. 2. Point A of the support arm 4 is attached to the rotatable shaft 3 by way of rotatable platform 12 so that when the shaft 3 rotates, the outer end of the arm (point B) revolves around the unit. Point B of said arm 4 would extend outward a predetermined distance from the motor 1. It is also noted that, as shown in FIG. 2, support arm 4 is preferably resilient and flexes and bends under the weight of an attached decoy 8 and/or during operation of the system (FIG. 5).

Figure 4:
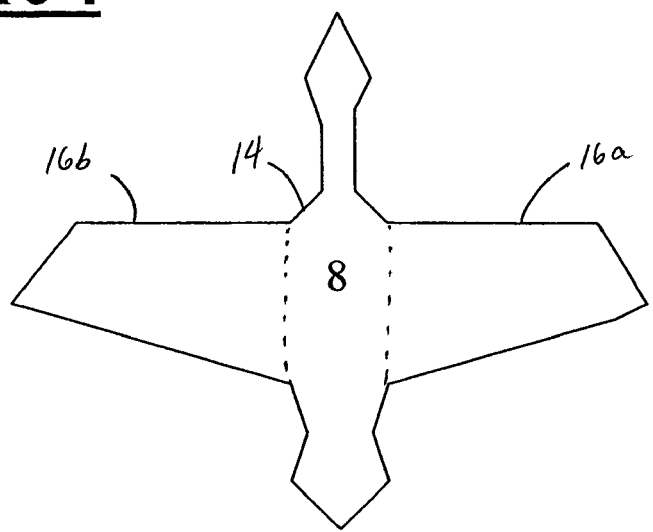
FIG. 4 is a top view of a waterfowl decoy for use with the support arms of FIG. 3 or 4.

FIG. 4 shows a waterfowl decoy 8 which is preferably fabricated from a lightweight material and fashioned in the shape of a waterfowl bird in flight with its wings spread. As shown in FIG. 4, the decoy 8 includes a body portion 14 with wings 16*a*, 16*b* spread and extending from opposed sides at the body portion 14 so as to simulate flight.

Figure 5:
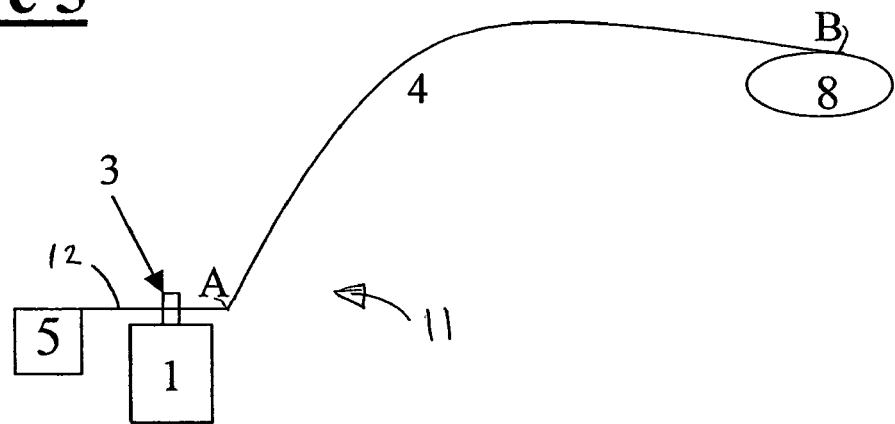
FIG. 5 is a side view of an assembled waterfowl decoy system showing the support arm of FIG. 2 and the decoy of FIG. 4 assembled to the electric motor of FIG. 1 in accordance with the invention.

Referring now to FIG. 5, an assembled decoy system 11 is shown with the support arm 4 of FIG. 2 securely fastened to shaft 3 of the motor 1 by way of rotatable platform 12 with a decoy 8 attached to the upper end B of the arm 4. When the motor 1 is engaged, the platform 12 is rotated and the support arm 4 turns and the decoy 8 resembles a bird in flight. A counter-weight 5 is shown to give the system 11 balance when only one decoy 8 is used. The system 11 is versatile and can be used as shown in FIG. 5, mounted to a post, or mounted to a floating platform.

Figure 6:
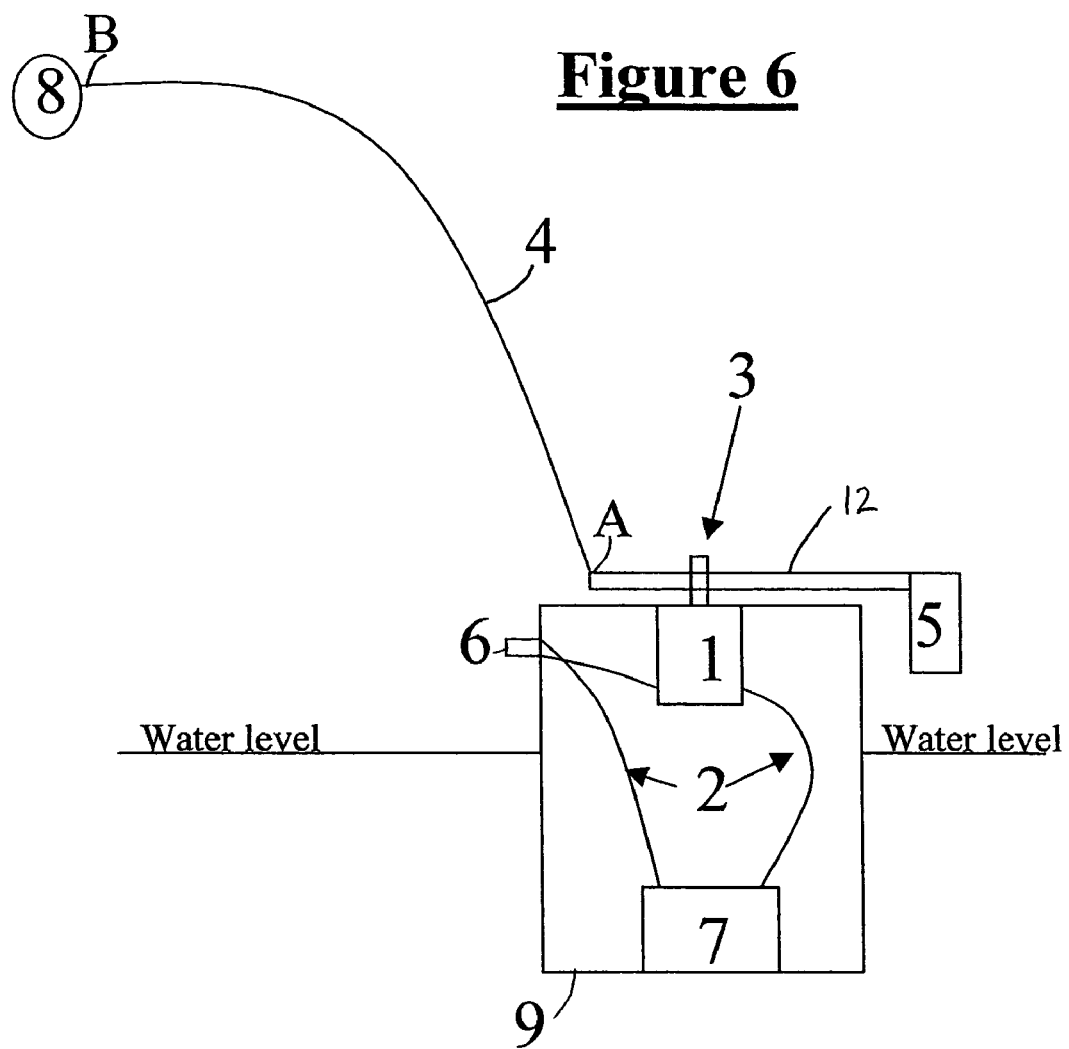
FIG. 6 is a side view of the assembled waterfowl decoy system of FIG. 5 mounted onto a buoyant housing in accordance with the invention.

FIG. 6 shows the assembled decoy system 11 of FIG. 5 mounted to a buoyant housing 9. With motor 1 positioned aboard the buoyant housing 9, an onboard power supply 7 is connected through the power wires 2 and controller 6. The support arm 4 is secured to platform 12 which in turn is secured to motor shaft 3. The decoy 8 is then attached directly to support arm 4 at point B. In operation, the decoy 8 has directional movement and will move in a circle as if in flight. The counter balance 5 helps keep the assembly stable while in motion when only one decoy 8 is used. The assembly could sit partially submerged to help stabilize itself as shown by the water level line.

As can be seen in FIG. 6, support arm 4 is preferably flexible and bends under the weight of the decoy 8, which is believed to enable the arm 4 to better adjust to torque and centrifugal forces generated during operation of the system 11 and to achieve a more natural appearing flight of the decoy 8.

Figure 3:
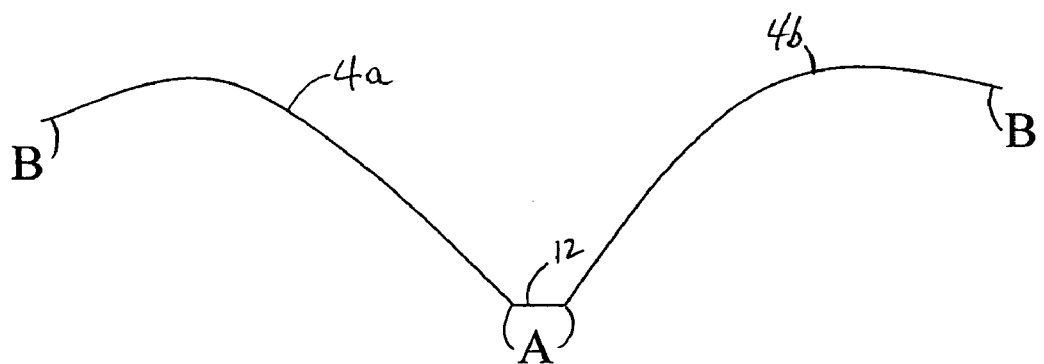
FIG. 3 is a side view of an alternate decoy support arm for supporting multiple decoys according to the invention.

The waterfowl luring apparatus of the present invention can employ multiple decoys 8. FIG. 3 shows an embodiment of a support arm configuration capable of imparting directional movement to two decoys 8. For this particular configuration, two support arms 4*a*, 4*b* are secured to opposed ends of a rotatable platform 12 at attachment points A in balanced fashion. Since the two decoys 8 are balanced against one another, the counter weight 5 employed in the single decoy embodiment of FIG. 5 is eliminated. Platform 12 is preferably secured to the motor shaft 3 at or about its midpoint or center. As stated, this multiple support arm configuration can be used in place of the single support arm configuration of FIG. 5 to animate multiple decoys 8.

Figure 8:
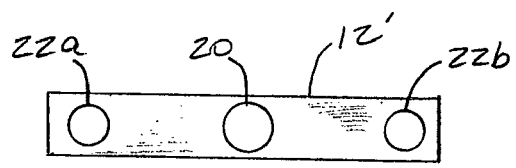
FIG. 8 is top view of a rotatable platform for use with a two-decoy system.

In addition to the configuration of FIG. 5, the rotatable platform 12 can be configured in a variety of ways to accommodate multiple decoys 8 in balanced fashion. For example, FIG. 8 shows a generally rectangular-shaped, rotatable platform 12' suitable for use with a two-decoy system. The platform 12' is secured to the motor shaft 3 at point 20, one support arm (such as arm 4*a* of FIG. 3) is attached at point 22*a* and a second support arm (such as arm 4*b* of FIG. 3) is attached at point 22*b*.

Figure 9:
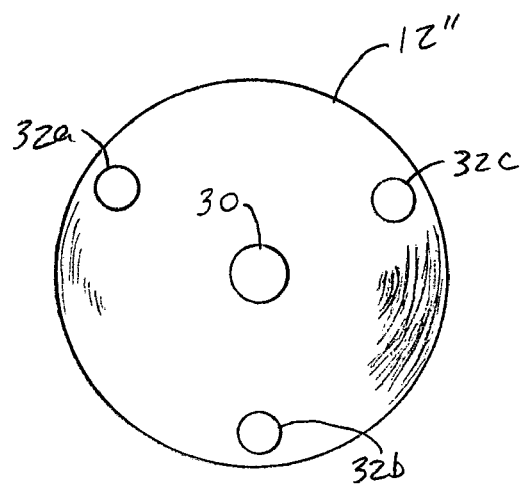
FIG. 9 is a top view of a rotatable platform for use with a three-decoy system.

The rotatable platform 12" of FIG. 9 enables balanced use of three decoys 8 when the platform 12" is attached to the motor shaft 3 at point 30 and three support arms 4 are attached at points 32*a*, 32*b* and 32*c*.

Figure 10:
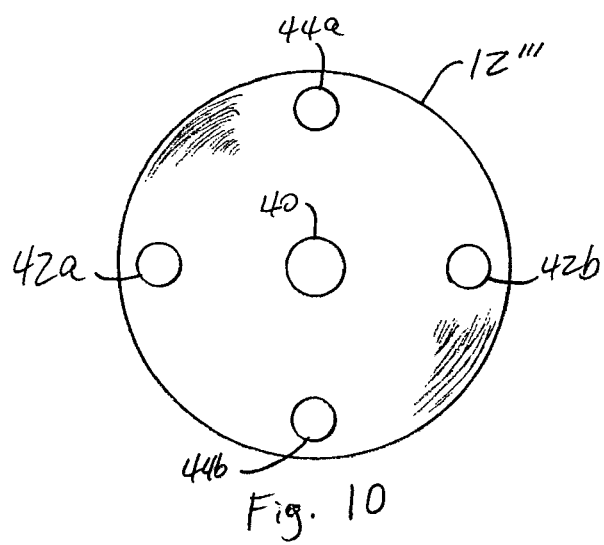
FIG. 10 is a top view of a rotatable platform for use with either a two or four-decoy system.

FIG. 10 shows a rotatable platform 12''' for balanced use with either two or four decoys 8. With the platform 12''' secured to the motor shaft 3 at point 40, one pair of support arms 4 can be attached in balanced fashion at points 42*a* and 42*b*. If desired, a second pair of support arms 4 can be attached at points 44*a*, 44*b*.

With reference again to FIG. 6, this figure shows a motor 1 attached to a buoyant housing 9. Many types of buoyant housings could be used to support the device in the water, but a bucket or barrel type housing with a lid 51 (FIGS. 11 & 12) or some other form of closable access is preferred since it can also serve well as a container for transporting and storage. A power source 7 is mounted in or on the floating platform and electrical connections 2 are made to the motor 1 through a controller 6. In the illustrated embodiment, a two-position ON/OFF switch is employed as the controller 6. In an alternate embodiment, the controller 6 is configured to also enable the user to control the speed of the motor 1 and to thereby control the speed at which the decoy(s) 8 are moved along their substantially circular path. In a further alternative embodiment, a remote control mechanism is employed as the controller 6 so as to enable control of the device from a distance. A remote control mechanism has the particular advantage of allowing the user to switch off the motor 1 during periods of waterfowl inactivity and to thereby conserve power. A remote control mechanism also enables the user to remain hidden from observant waterfowl when controlling operation of the device.

Figure 7:
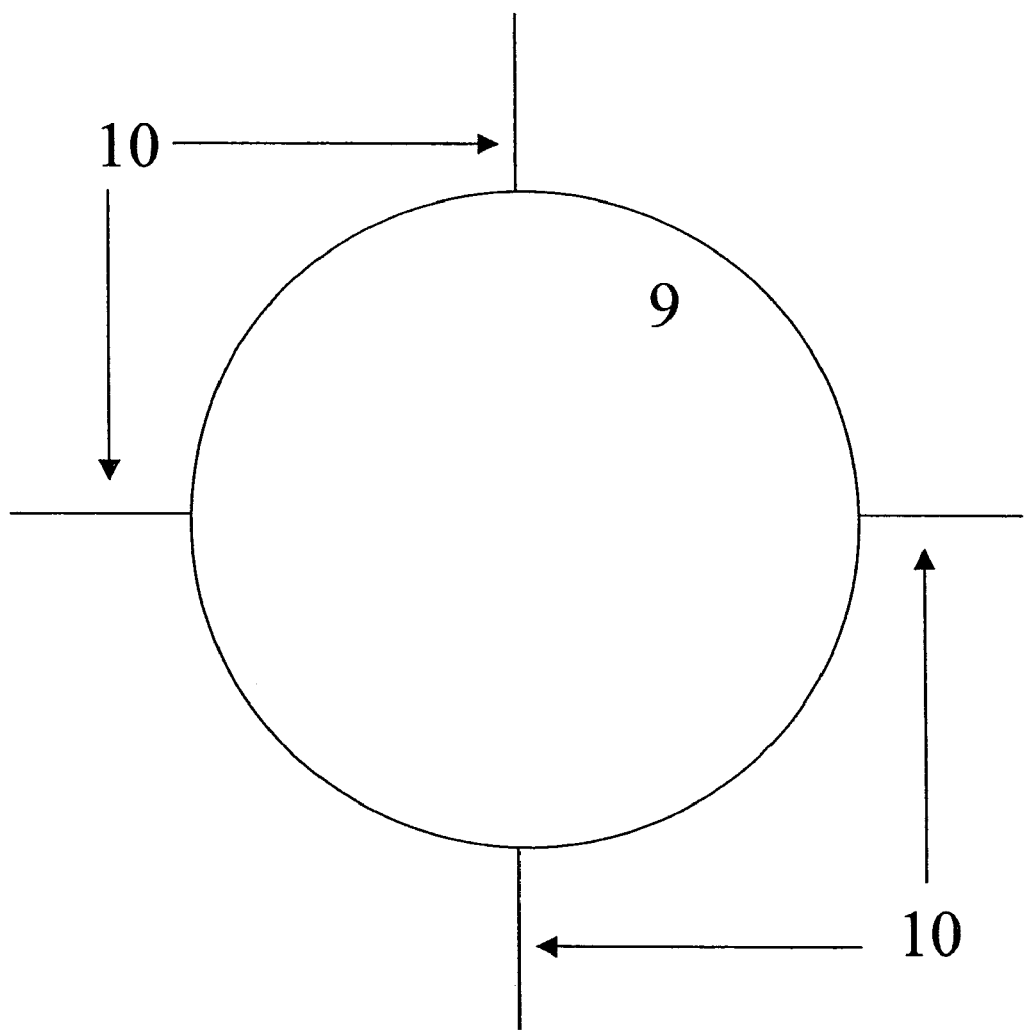
FIG. 7 is a bottom view of a buoyant housing with hydrodynamic drag inducing elements in accordance with the invention.

If the buoyant housing 9 used is round like a bucket, then it could have hydrodynamic drag inducing elements 10, such as those shown in FIG. 7, attached vertically to the outer surface of the housing 9 so as to counteract rotational torque and inhibit the tendency of the housing 9 to rotate in the water.

The buoyant housing 9 can be weighted as needed to cause it to sit in the water in a way that enhances stability. If only one decoy 8 is used, then a counter weight 5 could be used to help stabilize the unit as shown in FIG. 5. The motor 1 is preferably a gear driven electric motor that turns the shaft 3 an average of 30 RPMs. The shaft 3 extends vertically out of the motor 1 when the motor 1 is mounted adjacent the top portion of the buoyant housing 9. A support arm 4, such as the one shown in FIG. 2, is securely attached to the shaft 3 by way of rotatable platform 12 and extends out and up from the motor 1. As shown in FIG. 6 and as previously discussed, support arm 4 is preferably flexible and resilient and bends when loaded by the weight of the decoy 8 and by its own weight. Alternatively, the support arm 4 is made of a light but rigid material capable of supporting the weight of the decoy 8 to be attached to the upper end without bending or flexing. The support arm 4 should also be as small in diameter as possible so as not to draw attention of wary waterfowl.

The decoy 8 is preferably a light-weight, semi-rigid material that is fashioned into the shape of a duck or other waterfowl with its wings spread. There are some light-weight decoys 8 already on the market that are designed to sit atop a pole and shake in the wind, and these decoys 8 work well. The decoy 8 is attached to the upper end B of the support arm 4. When the motor 1 is engaged, the motor shaft 3 will spin causing the support arm 4 to rotate and the decoy 8 on the end of the arm 4 will revolve around the buoyant housing 9 as if flying in a circle as settling waterfowl often do. By incorporating the buoyant housing 9, the user is not limited to shallow waters like with some other mechanical decoys.

Figure 11:
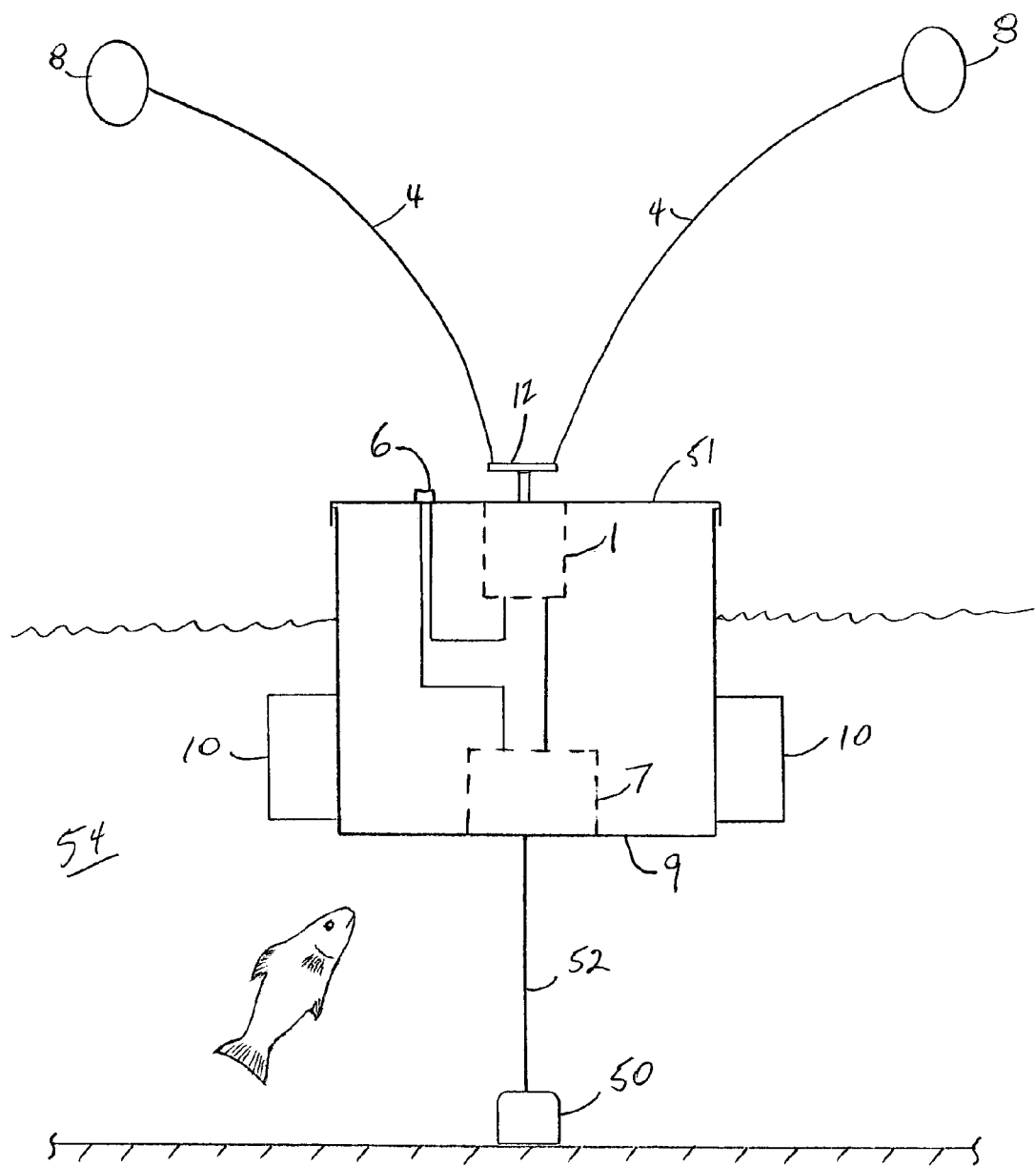
FIG. 11 is a side view of a waterfowl decoy system mounted onto a buoyant housing and incorporating hydrodynamic drag inducing elements onto the outer surface of the housing.

FIG. 11 shows a multiple-decoy embodiment of the waterfowl luring apparatus of FIG. 6. This embodiment shows use of hydrodynamic drag inducing elements 10 along with two or more decoys 8 attached to a rotatable platform 12 by way of support arms 4. An anchor 50 may be connected to the buoyant housing 9 by way of line 52 to enhance the ability to maintain the device in a desired position in the water 54. Directional movement of the decoys 8 is provided by a force-generating unit in the form of an electric motor 1 powered by a power source such as an onboard battery 7. Operation of the device is preferably enabled by a controller 6 as described above.

Figure 12:
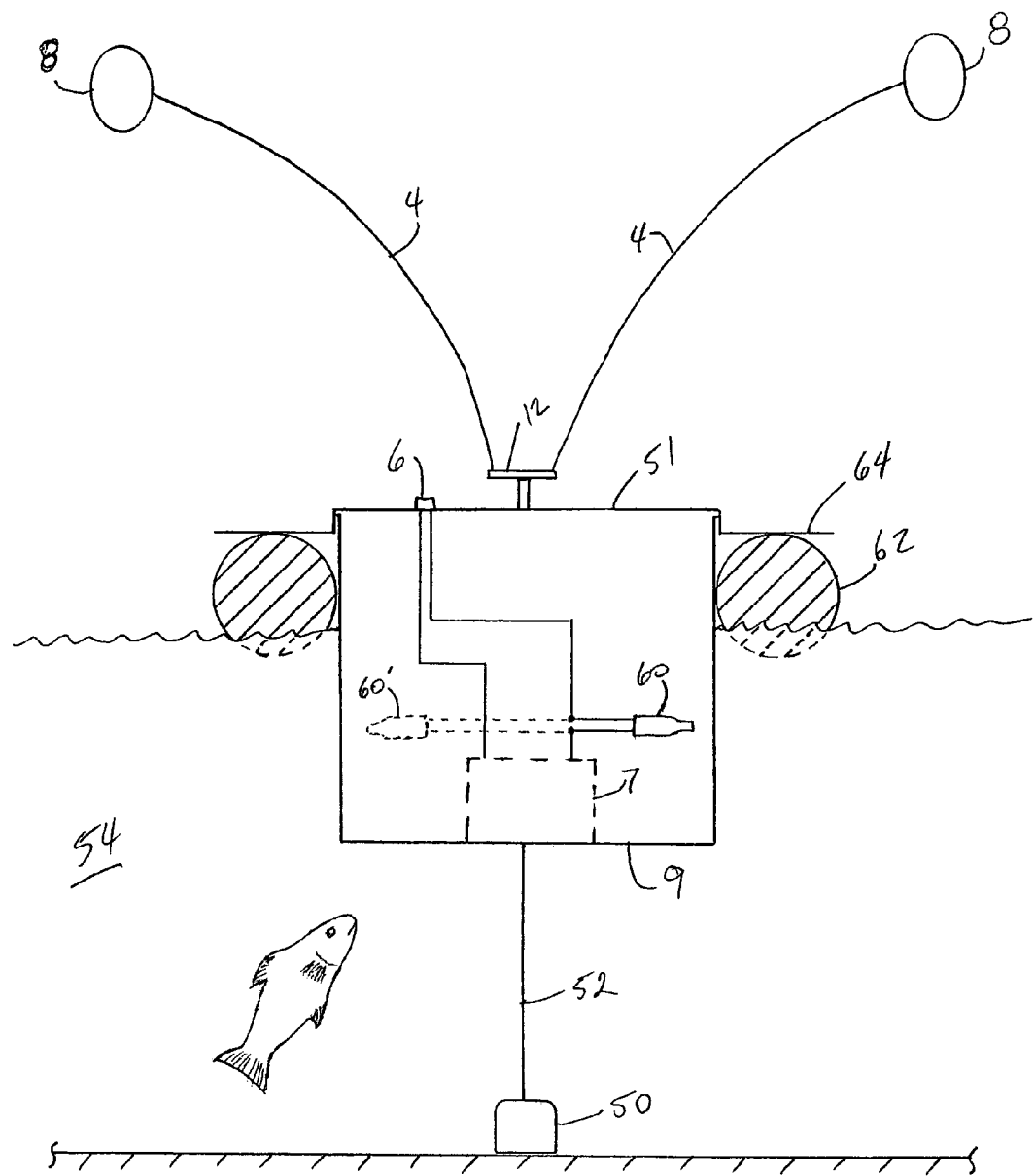
FIG. 12 is a side view of a waterfowl decoy system employing water pumps as the force-generating devices that impart directional motion to the decoys.

In a further embodiment shown in FIG. 12, decoys 8 are secured to a rotatable platform 12 by way of support arms 4. For this embodiment, however, the rotatable platform 12 is rigidly attached to the buoyant housing 9 and the housing 9 itself is rotated to impart directional motion to the decoys 8. Rotation of the housing 9 is achieved by use of an appropriate force-generating unit, such as a water pump 60 or other suitable jet propulsion device attached to the outer surface of the housing 9 which causes the housing 9 to spin in the water 54. Power source 7 provides the necessary power to operate the water pump 60, and controller 6 controls its operation. Preferably, two water pumps 60, 60' are employed in opposed relation so as to balance forces acting on the housing 9. Alternatively, a single pump 60 is employed to provide for asymmetric thrusting of the housing 9 and a desired directional motion of the decoys 8. If desired, a floatation device (such as an inflated inner tube 62) is operably associated with the buoyant housing to enhance the buoyancy of the device. The inner tube 62 or other floatation device may be attached directly to the housing 9, or the inner tube 62 may be secured in position by placing the inner tube 62 between the water 54 and a flange 64 formed along the upper portion of the housing 9. An anchor 50 may be connected to the buoyant housing 9 by way of line 52 to enhance the ability to maintain the device in a desired position in the water 54.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. An apparatus for luring waterfowl, the apparatus comprising:
    a rotatable platform;
    a force-generating unit for rotating the rotatable platform;
    a power source for powering the force-generating unit to rotate the rotatable platform;
    one or more support arms attached to the rotatable platform, each of said support arms including:
        a lower end attached to the rotatable platform; and
        an upper end positioned above the rotatable platform; and
    a waterfowl decoy attached to the upper end of each support arm with said decoy being positioned above the rotatable platform;
    wherein each decoy is moved along a substantially circular path above the rotatable platform as the rotatable platform is rotated by the force-generating unit, thereby providing a lure for waterfowl.

2. The apparatus of claim 1 wherein said force-generating unit includes an electric motor with an output shaft attached to the rotatable platform.

3. The apparatus of claim 1 wherein said force-generating unit includes a jet propulsion device.

4. The apparatus of claim 1 wherein said power source includes a battery.

5. The apparatus of claim 1 wherein each of said support arms includes an elongate rod having a substantially circular cross-sectional dimension.

6. The apparatus of claim 1 wherein each of said support arms is flexible and bends when a decoy is attached to the upper end of the support arm.

7. The apparatus of claim 1 wherein said waterfowl decoy includes a body portion with wings spread and extending from opposed sides of the body portion so as to simulate flight.

8. The apparatus of claim 1, further comprising a buoyant housing to which said force-generating unit is attached.

9. The apparatus of claim 8 wherein said rotatable platform is rigidly attached to the housing.

10. The apparatus of claim 8, further comprising a floatation device operably associated with the buoyant housing for enhancing buoyancy of the apparatus.

11. The apparatus of claim 8, further comprising one or more hydrodynamic drag inducing elements attached to an outer surface of the buoyant housing.

12. The apparatus of claim 8 wherein said power supply is positioned within the buoyant housing.

13. The apparatus of claim 12 wherein said force-generating unit is positioned within the buoyant housing.

14. The apparatus of claim 12 wherein said force-generating unit is attached to an outer surface of the buoyant housing.

15. The apparatus of claim 1, further comprising a controller for controlling operation of the force-generating unit.

16. An apparatus for luring waterfowl, the apparatus comprising:
    a rotatable platform;
    a force-generating unit for rotating the rotatable platform;
    a power source for powering the force-generating unit to rotate the rotatable platform;
    one or more support arms attached to the rotatable platform, each of said support arms including:
        a lower end attached to the rotatable platform; and
        an upper end positioned above the rotatable platform;
        wherein each of said support arms is flexible and bends when a decoy is attached to the upper end of the support arm; and
    a waterfowl decoy attached to the upper end of each support arm with said decoy being positioned above the rotatable platform;
    wherein each decoy is moved along a substantially circular path above the rotatable platform as the rotatable platform is rotated by the force-generating unit, thereby providing a lure for waterfowl.

17. The apparatus of claim 16 wherein said waterfowl decoy includes a body portion with wings spread and extending from opposed sides of the body portion so as to simulate flight.

18. The apparatus of claim 16, further comprising a buoyant housing to which said force-generating unit is attached.

19. An apparatus for luring waterfowl, the apparatus comprising:
    a rotatable platform;
    a force-generating unit for rotating the rotatable platform;
    a buoyant housing to which said force-generating unit is attached;
    a power source for powering the force-generating unit to rotate the rotatable platform;
    one or more support arms attached to the rotatable platform, each of said support arms including:
        a lower end attached to the rotatable platform; and
        an upper end positioned above the rotatable platform;
        wherein each of said support arms is flexible and bends when a decoy is attached to the upper end of the support arm; and a waterfowl decoy attached to the upper end of each support arm with said decoy being positioned above the rotatable platform;

wherein each decoy is moved along a substantially circular path above the rotatable platform as the rotatable platform is rotated by the force-generating unit, thereby providing a lure for waterfowl.

20. The apparatus of claim 19, further comprising a floatation device operably associated with the buoyant housing for enhancing buoyancy of the apparatus.

* * * * *

(12) EX PARTE REEXAMINATION CERTIFICATE (8418th)
United States Patent
Powell

(10) Number: US 7,434,347 C1
(45) Certificate Issued: Jul. 19, 2011

(54) WATERFOWL LURING SYSTEM

(76) Inventor: Charles D. Powell, Andersonville, TN (US)

Reexamination Request:
No. 90/011,065, Jul. 9, 2010

Reexamination Certificate for:
Patent No.: 7,434,347
Issued: Oct. 14, 2008
Appl. No.: 10/696,906
Filed: Oct. 30, 2003

Related U.S. Application Data

(63) Continuation-in-part of application No. 10/126,993, filed on Apr. 22, 2002, now abandoned.

(51) Int. Cl.
*A01M 31/06* (2006.01)

(52) U.S. Cl. .......................................................... 43/3
(58) Field of Classification Search .................. None
See application file for complete search history.

(56) References Cited

U.S. PATENT DOCUMENTS

| 5,377,439 | A | 1/1995 | Roos et al. |
| 6,044,581 | A | 4/2000 | Shipman et al. |
| 6,170,188 | B1 * | 1/2001 | Mathews ........................ 43/3 |

OTHER PUBLICATIONS

Fred Carter: "Pullin' the Birds", Shooting Sports Magazine, Sep. 2000, Cover page, Table of Contents and pp. 74–76.
Fred Carter: "Merry Go–round", Shooting Sports Magazine, Aug. 1999, cover page, Table of Contents, and pp. 82–84.

* cited by examiner

*Primary Examiner*—Jeffrey L. Gellner

(57) ABSTRACT

A waterfowl luring system provides directional motion to one or more waterfowl decoys. The system employs a motor or other force-generating device to rotate a platform to which one or more decoys are attached so that the decoys are moved in relation to rotation of the platform. In operation, the decoys are moved along a substantially circular flight path. The system is highly versatile and may be employed on dry land or in shallow as well as deep water environments.

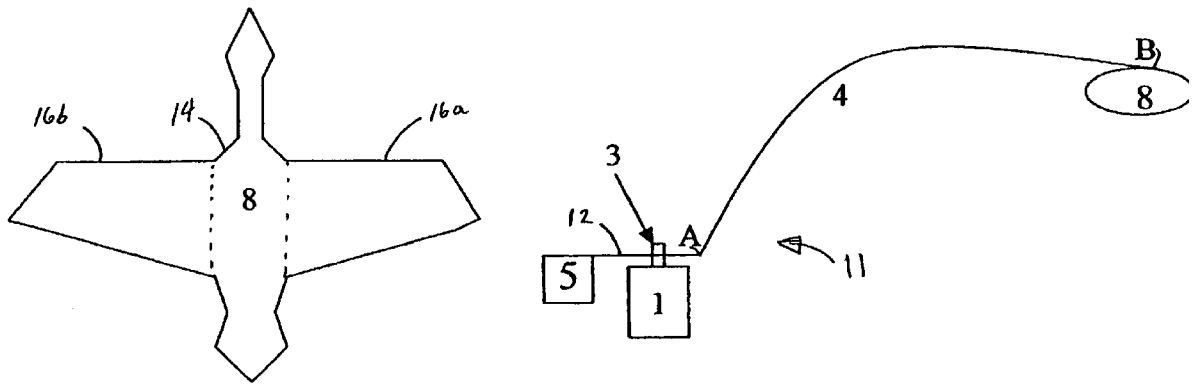

1
EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 19 and 20 is confirmed.

Claims 8 and 15-18 are cancelled.

Claims 1 and 9-14 are determined to be patentable as amended.

Claims 2-7, dependent on an amended claim, are determined to be patentable.

New claims 21 and 22 are added and determined to be patentable.

1. An apparatus for luring waterfowl, the apparatus comprising:
    a rotatable platform;
    a force-generating unit for rotating the rotatable platform;
    a power source for powering the force-generating unit to rotate the rotatable platform;
    one or more support arms attached to the rotatable platform, each of said support arms including:
    a lower end attached to the rotatable platform; and
    an upper end positioned above the rotatable platform; and
    a waterfowl decoy attached to the upper end of each support arm with said decoy being positioned above the rotatable platform;
    *a buoyant housing to which said force-generating unit is attached; and*
    wherein each decoy is moved along a substantially circular path above the rotatable platform as the rotatable platform is rotated by the force-generating unit, thereby providing a lure for waterfowl.

9 The apparatus of claim [8] *1* wherein said rotatable platform is rigidly attached to the housing.

10. The apparatus of claim [8] *1*, further comprising a floatation device operably associated with the buoyant housing for enhancing buoyancy of the apparatus.

11. The apparatus of claim [8] *1*, further comprising one or more hydrodynamic drag inducing elements attached to an outer surface of the buoyant housing.

12. The apparatus of claim [8] *1* wherein said power supply is positioned within the buoyant housing.

13. The apparatus of claim [12] *1* wherein said force-generating unit is positioned within the buoyant housing.

14. The apparatus of claim [12] *1* wherein said force-generating unit is attached to an outer surface of the buoyant housing.

*21. The apparatus of claim 1 further comprising a controller for controlling operation of the force-generating unit.*

*22. The apparatus of claim 19 further comprising a controller for controlling operation of the force-generating unit.*

* * * * *